W. G. COX.
BUMPER.
APPLICATION FILED JUNE 18, 1921.
1,395,908.
Patented Nov. 1, 1921.
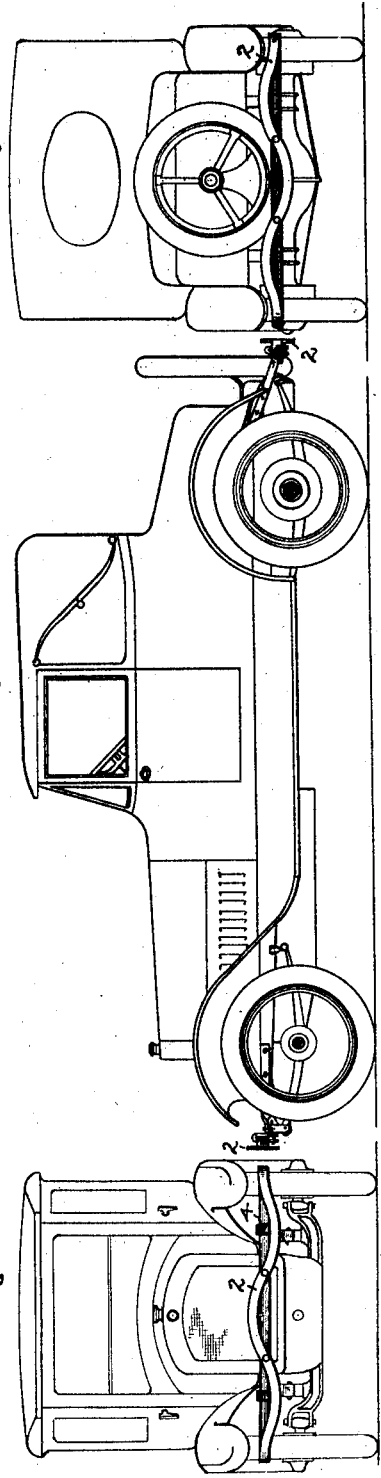
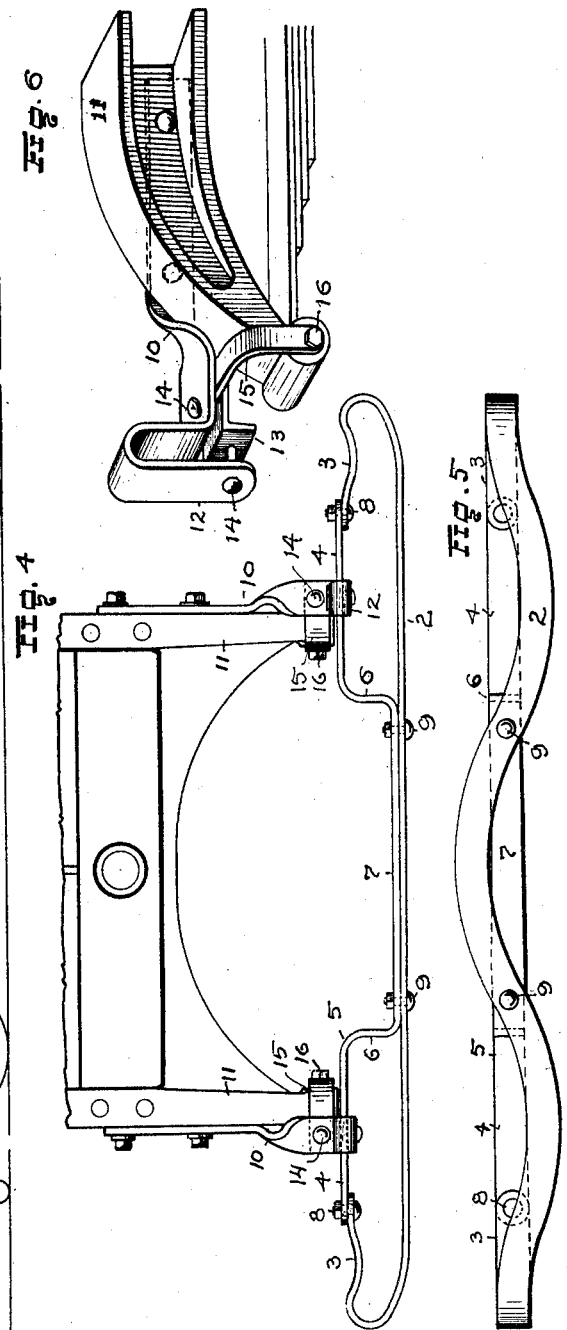
WILLIAM G. COX
By Fisher & Moest
Attorneys

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

BUMPER.

1,395,908.   Specification of Letters Patent.   Patented Nov. 1, 1921.

Application filed June 18, 1921. Serial No. 478,537.

*To all whom it may concern:*

Be it known that I, WILLIAM G. Cox, a citizen of the United States, residing at Cleveland, in the county of Cuyahoga, and State of Ohio, have invented certain new and useful Improvements in a Bumper, of which the following is a specification.

This invention pertains to a spring bumper for automobiles, and my object is to provide a bumper comprising a narrow elongated spring-metal bar of irregular curved outline from end to end and having the curved portions thereof projected to higher and lower planes on sweeping compound curves so that the impact face of the bumper will present a pleasing and attractive appearance and have each impact end portion of the bar in a different horizontal plane than the middle impact portion of the bar. The bumper also comprises a rear bar bent at its middle to provide a reinforcing backing for the middle portion of the front bar, and the end portions of this rear bar are straight and adapted to be supported within braced brackets affixed to the automobile frame. As constructed, the bumper may be mounted in two different positions on the automobile, merely by inverting or reversing it, and by mounting bumpers in inverted relation at opposite ends of an automobile the front bumper of one vehicle will engage the rear bumper of another vehicle similarly equipped only at points crossing or intersecting the reversely curved portions of the respective bumpers.

In the accompanying drawing, Figure 1 is a front view of an automobile equipped with my improved bumper; Fig. 2 is a side view of an automobile having bumpers embodying my invention, both at its front and rear; and Fig. 3 is a rear view of an automobile showing the same bumper as in Fig. 1, but reversed in respect thereto. Fig. 4 is a plan view of an end portion of an automobile frame having my improved bumper supported thereon. Fig. 5 is a front view of the bumper shown in Fig. 4. Fig. 6 is a perspective view of a portion of the frame of an automobile showing a bracket with a supplemental brace adapted to support my bumper.

The present invention comprises a bumper made of a flat bar 2 of spring steel which is curved rearwardly and bent inwardly for a short distance at each end to provide short spring extremities or arms 3 adapted to be united with the opposite straight ends 4—4 of a second steel bar 5 which is bent at right angles at two places 6—6 to project a middle flat portion 7 forwardly the requisite distance so as to bear against and stiffen the middle portion of front bar 2. The front and rear bars are united together at their meeting ends by rivets or bolts 8, and are further secured together by bolts 9 where crossed and engaged between their ends.

Impact bar 2 curves downwardly at each end and thence upwardly on sweeping curves toward the center so as to bring the flat face of the bar at each end of the bumper below the longitudinal median line of the bumper and a reverse curve at the center of the bumper places the middle impact portion of the bumper above said longitudinal median line. The reversely curved portions of the impact bar involve the full length of said bar and provide relatively long curved impact faces at each end of the bar and a relatively long curved middle impact portion lying in different horizontal planes above and below the longitudinal median line of the bumper.

The straight ends 4 of rear bar 5 are adapted to be supported within brackets 10 bolted or otherwise attached to the vehicle frame 11, and clamping of the bar within the reversely bent end 12 of each bracket is effected by a right-angled clamping member 13 and bolts 14. A lateral brace 15 is also clamped at one end to bracket 10 by member 13 and secured at its other end to the extremity of frame 11 by a bolt 16, see Fig. 6.

For the sake of economy and convenience I make this bumper of two pieces or bars,—a rear supporting bar and a front impact bar, but a single long bar may be used instead and bent to produce a bumper of substantially the same shape and form as shown and described herein.

What I claim is:

1. A bumper for automobiles, comprising a bar having reversely curved portions involving the full length thereof and providing relatively long curved impact faces at each end of the bar and a relatively long and reversely curved impact portion at the middle of the bar.

2. A bumper for automobiles, comprising a flat bar having reversely bent supporting extremities extending rearwardly and toward each other and reversely curved from end to end on obtuse angular lines to provide separate elongated end and middle impact portions lying in different horizontal planes relatively to said extremities.

3. A bumper for automobiles, comprising a front impact bar curved reversely from end to end, and a rear bar having a middle portion bearing against the middle portion of the front bar and united at its ends to the ends of said front bar.

4. A bumper for automobiles, comprising a front bar having reversely bent arms and a relatively long curved impact portion at each end and a reversely curved impact portion at its center, and a rear bar having straight ends connected with said arms and a straight middle offset portion bearing against and united with said front bar at each side of its center.

WILLIAM G. COX.